United States Patent [19]
Kitamura et al.

[11] Patent Number: 5,946,004
[45] Date of Patent: Aug. 31, 1999

[54] ENHANCED FUNCTION BOARD FOR USE IN PROCESSING IMAGE DATA AND IMAGE PROCESSING APPARATUS USING THE SAME

[75] Inventors: Kenya Kitamura; Masayuki Suzuki; Seisuke Morioka; Ryoji Kuroda, all of Tokyo, Japan

[73] Assignee: Sega Enterprises, Ltd., Tokyo, Japan

[21] Appl. No.: 08/796,476

[22] Filed: Feb. 10, 1997

[30] Foreign Application Priority Data

Feb. 19, 1996 [JP] Japan .................................... 8-030564

[51] Int. Cl.⁶ ...................................................... G06F 15/16
[52] U.S. Cl. ......................... 345/502; 345/502; 345/503; 463/31
[58] Field of Search .................................... 345/502, 503, 345/202; 463/31

[56] References Cited

U.S. PATENT DOCUMENTS

5,388,841  2/1995  San et al. ................................... 463/44
5,692,162  11/1997 Okawa ..................................... 345/503

*Primary Examiner*—Kee M. Tung
*Assistant Examiner*—Sy D. Luu
*Attorney, Agent, or Firm*—Dickstein Shapiro Morin & Oshinsky LLP

[57] ABSTRACT

A video game device is disclosed which is composed of a console apparatus in which a processor is installed to execute a game software program. The video game device also includes a memory device, such as a memory cartridge which is removably attached to the console apparatus and which stores the game program. An enhanced function board is attached to the main body of the video game device for improving and enhancing the functions of the video game. The enhanced function board includes a pair of buses, first and second digital processors connected to the buses, a FIFO memory connected between the buses, and an interface circuit connected to the pair of buses. The interface circuit operates to connect the first and second digital processors to the processor of the video game device.

14 Claims, 8 Drawing Sheets

ENHANCED FUNCTION BOARD FOR USE IN PROCESSING IMAGE DATA AND IMAGE PROCESSING APPARATUS USING THE SAME

BACKGROUND OF THE INVENTION

1. Field of the Invention

The present invention relates to an enhanced function board on which is mounted a circuit for enhancing an image processing function, and an image processing apparatus that employs the image enhancing board. In particular, the present invention pertains to the arrangement of an enhanced function board on which is mounted a circuit for enhancing various image processing functions for an image processing apparatus having basic functions, and a video game device on which the enhanced function board is mounted.

2. Related Arts

One type of multimedia applications is used as a video game device. The processing speed of the hardware used for video game devices has been increased and the type of software programs available have been increased in order to respond to the demands of users. Furthermore, procedures for producing more realistic and higher quality images have been developed.

In general, a video game device is composed of a console apparatus in which a processor is installed to execute a game software program, and a memory device such as a memory cartridge which is removably attached to the console device and stores the game software program.

Further, the contents of a video game executed by the video game can be changed by altering the game software program that is stored in the memory cartridge. In such the case, the speed of execution of a video game is limited to the range of the control provided by the hardware arrangement in the console apparatus and the design of game software programs.

SUMMARY OF THE INVENTION

It is, therefore, a first object of the present invention to provide an enhanced function board that can add an improved function for a basic hardware arrangement in an image processing apparatus such as a video game device.

It is a second object of the present invention to provide an arrangement for an enhanced function board for which sequential addition of functions is possible in a video game device.

It is a third object of the present invention to provide an enhanced function board that can easily change connection and a data stream in consonance with the purpose for which it is used.

It is a fourth object of the present invention to provide an image processing apparatus that employs the above described enhanced function board.

It is a fifth object of the present invention to provide an arrangement for the enhanced function board, and that facilitates calculations performed by a CPU for the employment of two-dimensional screen coordinates to establish the location of a three-dimensional object, on a game execution screen, which is managed by the CPU, and that reduces the load placed on the CPU.

It is a sixth object of the present invention to provide an image processing apparatus that employs an enhanced function board that matches the above described objects.

To achieve the above objects, according to the present invention, an enhanced function board, which can be connected via a connector to an image processing apparatus that includes a CPU, a memory in which image data is stored, and a video signal processor for accessing the memory to read image data for a display, and for preparing image data based on the image data that is controlled by the CPU, may include a pair of buses, first and second digital signal processors which are respectively connected to the pair of buses, an FIFO memory connected to the pair of buses, and an interface circuit connected to the pair of buses, whereby the first and the second digital signal processors may be connected via the interface circuit to the CPU and the video signal processor.

Further object of the present invention will become more clear from the description according to the drawings.

DETAILED DESCRIPTION OF THE PREFERRED EMBODIMENT

The preferred embodiment of the present invention will now be described while referring to the accompanying drawings. The same reference numerals or signs are used to denote corresponding or identical components in the drawings.

Figure 1:
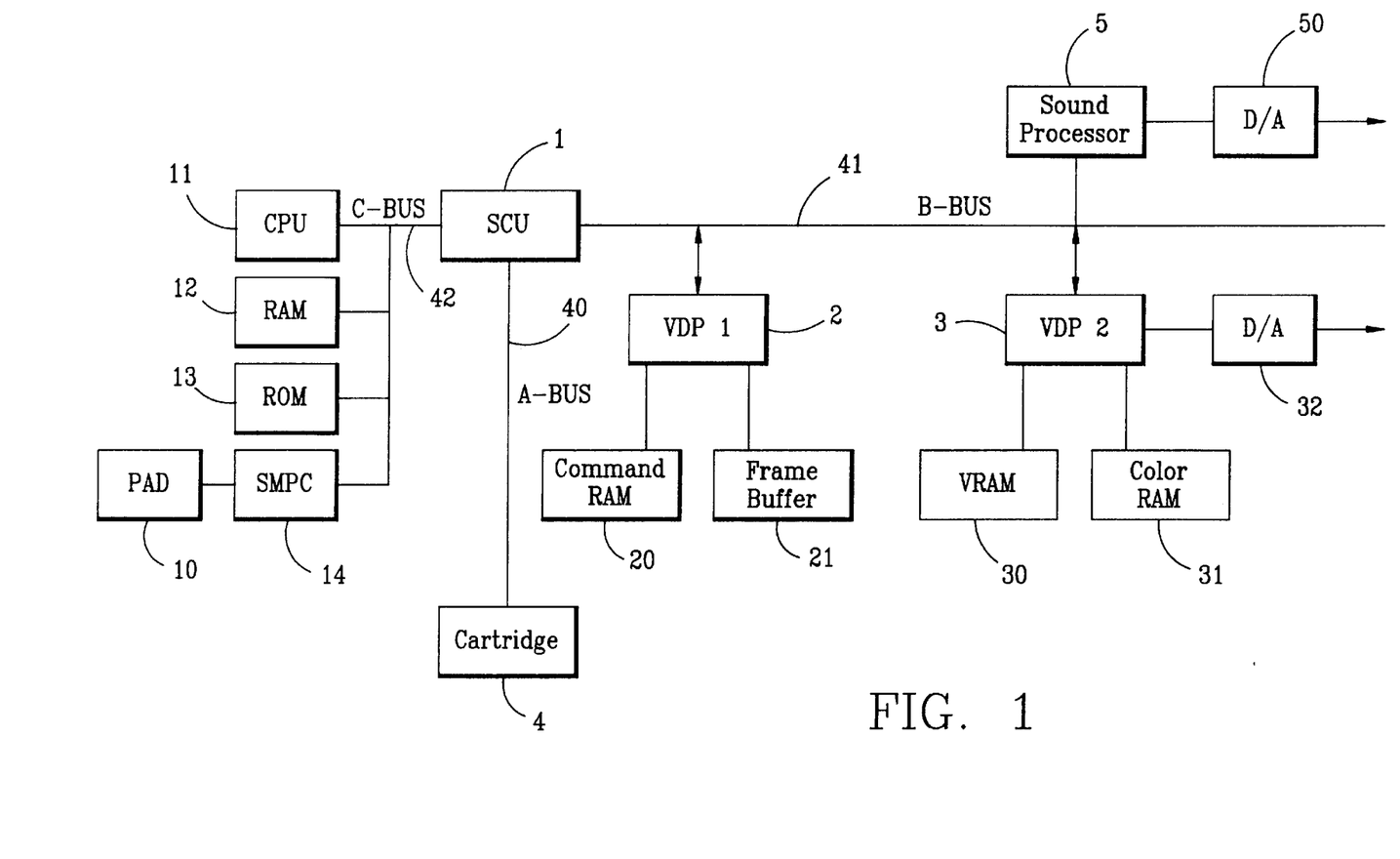
FIG. 1 is a diagram illustrating the basic structure of an image processing apparatus of which functions are enhanced by an enhanced function board according to the present invention.

FIG. 1 is a block diagram illustrating the general arrangement of a video game apparatus for employment as an image processing apparatus that was developed by the present applicant. An input device 10 is a control pad employed by a player when operating a game. The control pad 10 is one that is separated from and connected to a video game apparatus by an electrical or optical cord and is held in the hands of a player, or an input button that is an integrally formed part of the video game apparatus.

The control pad 10 is connected to a C-BUS 42 of the video game apparatus via an SMPC (System Manager & Peripheral Control) 14, which serves as an I/O controller. The SMPC 14 manages the resetting of the video game apparatus and functions as an interface for an external device, such as the control pad 10.

The video game apparatus is equipped with a connector by which a memory cartridge 4 is removably attached to the video game apparatus. Incorporated in the memory cartridge 4 is a semiconductor read only memory (ROM) where a game software program is written and stored. The ROM in the memory cartridge 4 is accessed by the video game apparatus across an A-BUS 40. Game program data are then read from the ROM in the memory cartridge 4 and transmitted to the video game apparatus.

A CPU 11, a RAM 12 and a ROM 13, in addition to the SMPC 14, are connected together by the C-BUS 42. The CPU 11 reads a game software program stored in the ROM in the memory cartridge 4 and executes it. The CPU 11 also exercises controls of the entire video game apparatus. The CPU 11 is a high speed processing 32-bit RISC CPU, for example.

A system controller 1 includes a DMA controller (dynamic memory access controller) and an interrupt controller, and serves as a coprocessor for the CPU 11.

A sound processor 5 controls PCM or FM sound signals by managing digital signals that are converted into analog signals by a D/A converter 50 and are thereafter output through a loudspeaker (not shown).

A B-BUS 41 in the apparatus is connected to the system controller 1 and the sound processor 5. In addition, the B-BUS 41 is connected to a first video display processor 2 (VDP1) for controlling the display of characters that appear during a game on a monitor screen, and a second video display processor 3 (VDP2) for performing scrolling, such as fixing a background screen and rotating or moving the background screen upward and downward, and to the right and to the left.

A command RAM 20 and a frame buffer memory 21 are connected to the first video display processor 2 (VDP1). The first video display processor 2, the command RAM 20 and the frame buffer memory 21 constitute a first image data processing unit for performing image processing to display sprites or characters, which serve as a background screen.

The first video display processor 2 is formed as an IC chip on a semiconductor chip. As mentioned above, the first video display processor 2 is connected to the command RAM 20 (constituted by DRAM, for example) and the two-screen frame buffer memory 21 (each screen has a memory capacity of 2M bits, for example).

Command data from the CPU 11 and image data that are for an original foreground image are stored in the command RAM 20. Image data for sprite or object images that are displayed as foreground images are mapped in the frame buffer 21.

The CPU 11 executes a software program stored in the ROM 13 and transmits display command data to the first video display processor 2. The first video display processor 2 writes the received command data in the command RAM 20 in the form of a command table.

The written command data is selectively read out, and in consonance with the command data, rotation, enlargement, reduction and color computation are performed to modify images of sprites. The modified data are written at a predetermined addresses in the frame buffer 21, and foreground image data for one frame is mapped in the frame buffer 21.

The first video display processor 2 sequentially reads the image data for one frame that is written in the frame buffer 21, and transmits the image data to the second video display processor 3. Data for controlling display is set in a system register in the first video display processor 2.

The second display processor 3, a VRAM 30 and a color RAM 31 constitute a second image data processing unit for performing image processing on a scroll screen that serves as a background screen.

As same as the first video display processor 2, the second video display processor 3 is formed on a semiconductor chip. The second video display processor 3 incorporates a register (not shown) in which data for generating image data is set, and connected to a color RAM 31, having a predetermined memory capacity in which color code is recorded, and a VRAM 30.

The second video display processor 3 reads data stored in the VRAM 30 in accordance with the setup of the above described incorporated resister (not shown). In addition, the second video display processor 3 determines display priorities in consonance with the setup of the image data register for a scroll screen, and outputs image data in accordance with the display priorities.

The image data that has been output is converted into display color data, which is then converted into analog signals by a D/A converter 32. Then, the analog signals for display color data are output to a display device (not shown). The image display data is set in the VRAM 30 and in the color RAM 31 via the system controller 1.

The VRAM 30 is divided into two frame sections having the same capacity. In each frame section of the VRAM 30 are stored pattern data, which are data for a cell of 8×8 pixels, and pattern name data (an address indicating a location of pattern data stored in the color RAM 31) that, to form a background screen for one frame by covering m×n cells, designates which cells should be used that are defined in the color RAM 31 in consonance with cell distribution.

The foreground screen data that is output by the first video display processor 2 and the background screen data that is transmitted by the second video display processor 3 are synthesized to provide the above described image display data.

Figure 2:
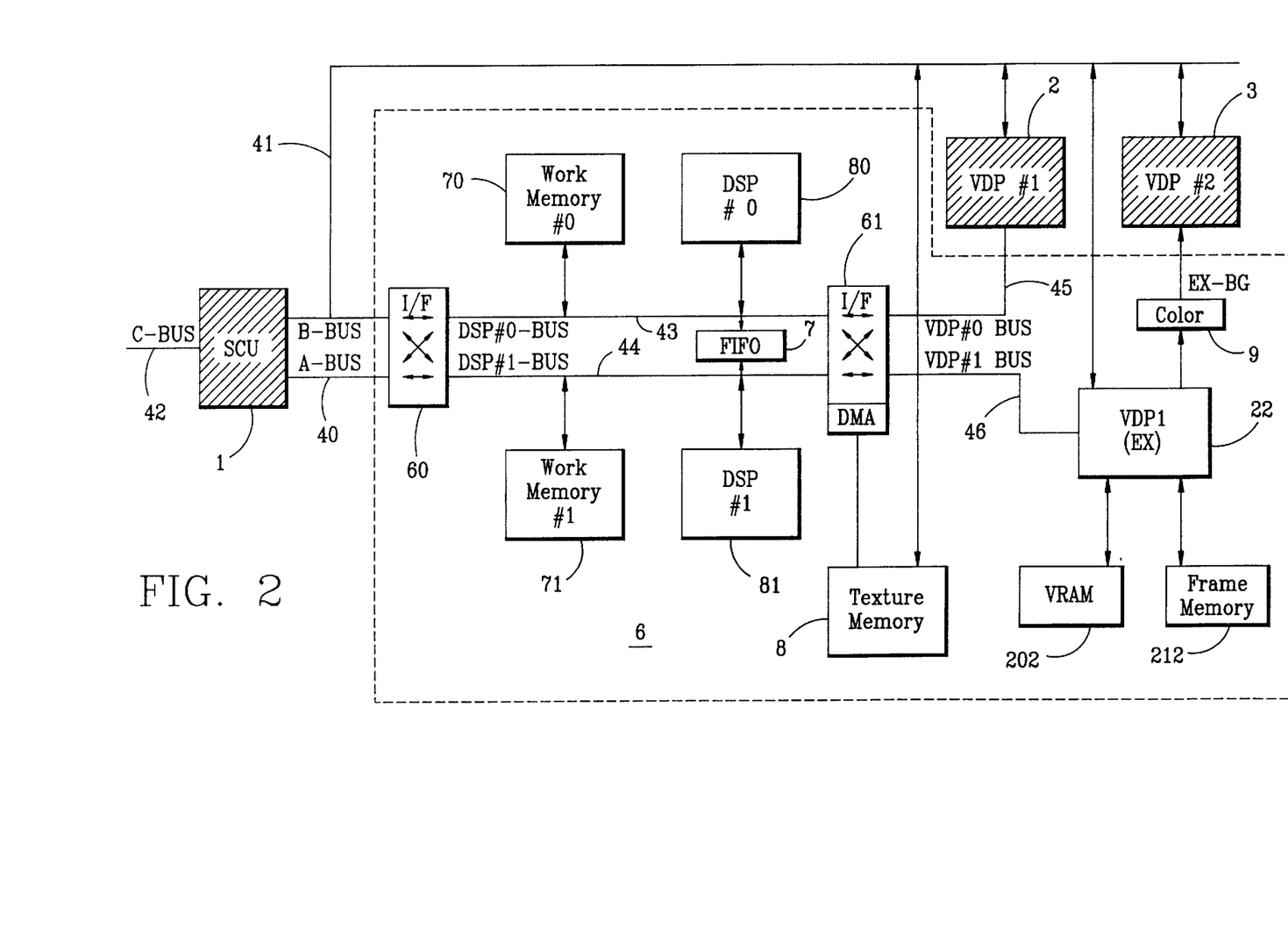
FIG. 2 is a block diagram illustrating one embodiment of an enhanced function board according to the present invention.

FIG. 2 is a block diagram illustrating one embodiment of an enhanced function board according to the present invention for enhancing the functions performed in the apparatus as explained in FIG. 1.

In FIG. 2, a system control unit 1 and a first and a second video display processors 2 and 3 are included in the basic arrangement of the image processing apparatus as explained while referring to FIG. 1.

The other components are included in the enhanced function board according to one embodiment of the present invention. In other words, in FIG. 2, a portion 6 enclosed by broken lines indicates the enhanced function board.

In FIG. 2, the enhanced function board 6 has a first interface circuit 60 to be connected to an A-BUS 40 and a B-BUS 41. The enhanced function board 6 also includes a second interface circuit 61, which is connected to the first interface circuit 60 via a BUS 43 and a BUS 44 to which a first DSP (digital signal processor) #0 80 and a second DSP#1 81 are respectively connected.

A first work memory 70 is connected to the first DSP#0 80 are to the DSP via the BUS 43, and a second work memory 71 is connected to the second DSP#1 81 via the BUS 44.

The first and the second DSPs 80 and 81 respectively have a 32-bit floating point processor function, and incorporate a high speed RAM that is used both for programs and data of predetermined bits. Preferably, the processor function is programmable. The internal RAM can be accessed across either the A-BUS 40 or the B-BUS 41 by the switching function of the first interface 60, which will be described later.

Since the two DSPs 80 and 81 are independently located on the buses, even when one DSP is in use, is being accessed by the system control unit 1, the other DSP is available and can be operated with no problem.

The first work memory 70 and the first DSP#0 80, and the second work memory 71 and the second DSP#1 81 are connected through an FIFO (First-In-First-Out) memory 7 and respectively via the BUS 43 and the BUS 44, so that data can be transmitted from the first DSP#0 80 to the second DSP#1 81.

An enhanced video display processor 22, which is the same as the first video display processor 2, is provided as an object (sprite) display processor. The apparatus can perform high speed processing by operating the two video display processors 2 and 22 in parallel.

The enhanced video display processor 22 has a VRAM 202, which is a local RAM having a predetermined capacity, and a frame buffer 212 for two frames.

To supplement the clipping process, a texture memory 8 supports a DMA (Dynamic Memory Access) function that permits the video display processor 22 to access the frame buffer 212. The texture memory 8 has a 4M bit memory capacity and data are read from the texture memory 8 when the function of the DMA is executed.

The DMA is activated by the first video display processor 2 by setting a register, and cell data for one raster is transmitted to the video display processor 22. The texture memory 8 can also be directly accessed across the B-BUS 41.

A color interface circuit 9 acts as an interface for image data provided by the video display processor 22 to an external screen input for the second video display processor 3. With this interface, all resolutions that are possible with the image processing apparatus are supported, and a color RAM can be employed independently from the second video display processor 3.

Figure 3:
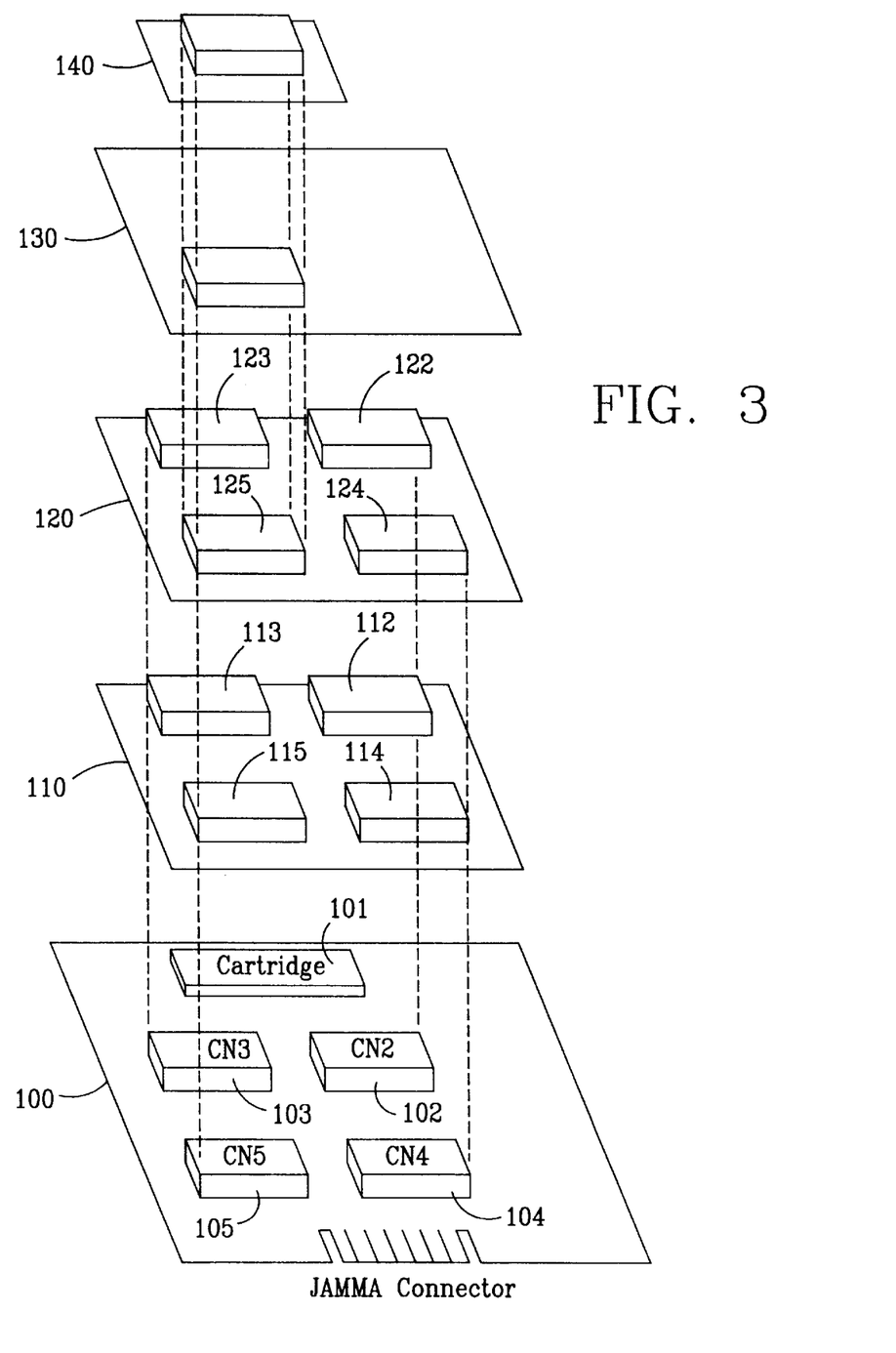
FIG. 3 is a diagram for explaining a structure of the enhanced function board shown in FIG. 2.

The thus arranged, enhanced function board is coupled with a main board of an image processing apparatus, as is shown in FIG. 3. In FIG. 3, a main board 100 constitutes the main board of the image processing apparatus, and is electrically connected to the electrical sources such as signal sources and power sources in the image processing apparatus through a JAMMA connector.

On the main board 100 are five connectors 101 through 105 are provided. The first connector 101 is connected to the memory cartridge 4; the second connector 102 is connected to the A-BUS 40; the third connector 103 is connected to a signal line, such as a clock signal line or a sound circuit reset signal; the fourth connector 104 is connected to the C-BUS 42, which communicates with the CPU 11; and the fifth connector is connected to the B-BUS 41.

In FIG. 3, an enhanced function board 110 is provided according to the present invention and includes four connectors 112 through 115. The four connectors 112 through 115 are connected to the corresponding connectors 102 through 105 on the main board 100. The enhanced function board 110 (identified as reference numeral 6 in FIG. 2) is connected to the A-BUS 40 and the B-BUS 41 on the main board 100, as is shown in FIG. 2. Although the connector 114 is mounted on the enhanced function board 110, it is not connected to the C-BUS 42.

Similarly, when a communication board 120 is to be expanded and mounted on the enhanced function board 110, connectors 122 through 125 on the communication board 120 are connected to the connectors 112 through 115 of the enhanced function board 110.

A CD-ROM control board 130 and a sub-board 140 are also connected to the necessary buses on the main board 100 via connectors.

Figure 4:
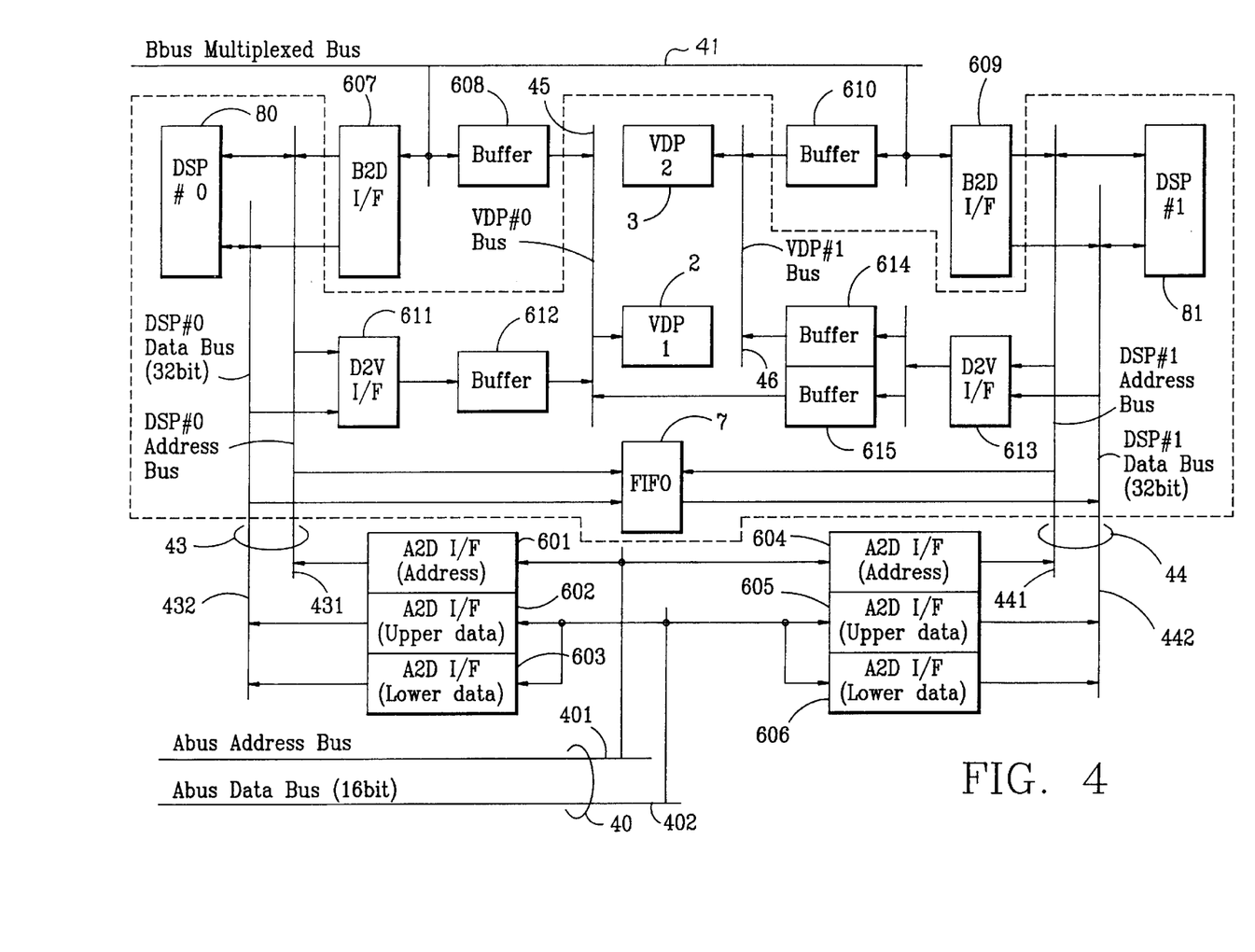
FIG. 4 is a diagram showing an example arrangement of an interface circuit used in the enhanced function board of FIG. 2.

FIG. 4 is a detailed diagram illustrating the arrangement of the core of the enhanced function board 110. On the enhanced function board 110 according to the present invention, connection of the first and the second DSP 80 and 81 can be changed in consonance with the processing. In order to enable the change in the combination, the first and the second interface circuits 60 and 61 include three interface functions described below.

In FIG. 4, the A-BUS 40 that is connected to the system control unit 1 consists of an address bus 401 and a data bus 402. The B-BUS 41 is a multiplexed bus on which multiplexed address and data are transferred.

The DSP-BUS 43 that is connected to the first DSP#0 80 has an address bus 431 and a data bus 432. Similarly, the DSP-BUS 44 connected to the second DSP#1 81 has an address bus 441 and a data bus 442.

Of the three interface functions, the first interface is the circuit that is provided for accessing the first and second DSPs 80 and 81 across the A-BUS 40, and is included in the first interface circuit 60.

The first interface circuit 60 includes circuits for controlling both an address portion and a data portion. Address interface circuits 601 and 604 correspond to the circuit for controlling the address portion.

The address interface circuits 601 and 604 latch an address across the address bus 401 of the A-BUS 40, and output it to the address buses 431 and 441 of the DSP-BUSes 43 and 44. The address interface circuits 601 and 604 also latch an address and advance it to support the DMA.

Data interface circuits 602, 603, 605 and 606 correspond to the circuit for controlling the data portion, and have functions of performing the write/read access function via the A-BUS 40 and transferring data under the DMA to the DSP-BUSes 43 and 44.

With this write access function, the data interface circuits 602 and 603, and 605 and 606 latch two 16 bit strings of data, and perform bus-sizing to convert the latched data into 32-bit data, which are then transferred to the DSPs 80 and 81.

With the read access function, a 32-bit string is latched via the buses 43 and 44, and two 16-bit data strings are transmitted to the data bus 402 of the A-BUS 40 by the interface circuits 602 and 603.

With the DMA transfer function, the interface circuits 602, 603, 605 and 606, which correspond to the DMA transfer access circuits, determine the state of the A-BUS 40, latch two 16-bit strings of data that have been read across the A-BUS 40, and perform bus sizing to convert the 16-bit data into 32-bit data, which are then transferred to the DSP buses 432 and 442.

The second interface is a circuit prepared for accessing the first and the second DSPs 80 and 81 across the B-BUS 41, and is included in the first interface circuit 60 in FIG. 2.

The second interface comprises four functional circuits: a circuit for separating an address from data on the B-BUS 41, whereat address and data are multiplexed; a circuit for controlling the separated address; a circuit for controlling the data; and a circuit for controlling a transfer destination. These four circuits are included in circuits 607 and 609 in FIG. 4.

The address and data separation circuit separates multiplexed address and data on the B-BUS 41 and latches them.

The address control circuit advances a separated address so as to provide total access at the separated address location. The data control circuit has a write access circuit and a read access circuit. The write access circuit has a three-stage 16-bit latch circuit, which efficiently latches data during a burst transfer across the B-BUS 41. The data are transmitted to the data buses 432 and 442 for the DSPs 80 and 81.

The read access circuit has a two-stage 32-bit latch circuit, which efficiently latches data from the DSPs 80 and 81. Bus sizing is performed to convert the 32-bit data into 16-bit data for the B-BUS 41.

The first and the second DSP buses 43 and 44, and the first and the second VDP buses 45 and 46 can be used for accessing the enhanced board across the B-BUS 41. An internal register (bank switching register) for deciding a transfer destination for the B-BUS access is included as a transfer destination controller. The transfer control circuit switches buffers 608 and 609 based on the contents of the bank switching register in order to access a transfer destination.

The bank switching register can be changed as needed by accessing it across the A-BUS 40. When the bank is switched while the access via the B-BUS 41 has not yet been completed, the access is updated after the B-Bus 41 access process has been terminated.

The third interface circuit is prepared for accessing the VDP buses 45 and 46 from the DSP buses 43 and 44, and is constituted by a write access circuit and a read access circuit.

These two circuits are included in the second interface circuit 61 shown in FIG. 2, and correspond to interface circuits 611 and 613, and buffer circuits 612, 614 and 615 in FIG. 4.

For write accessing, the interface circuit 611 includes a circuit for latching an address across the DSP address bus 431 and a two-stage 32-bit latch circuit for latching data across the DSP address bus 432.

Similarly, the interface circuit 611 includes a circuit for latching addresses across the VDP bus 431 and a two-stage 32-bit latch circuit for latching data across the DSP address bus 442. The latched address and data are multiplexed and transferred via the buffer circuits 612 and 614 to the first and second VDP buses 45 and 46.

Further, for read accessing, the interface circuit 611 has a circuit for latching addresses across the VDP bus 45 and a three-stage 16-bit latch circuit for latching data that has been read, and performs bus sizing to convert the addresses and read data into 32-bit data, which are transferred to the DSP bus 44.

Likewise, the interface circuit 613 includes a circuit for latching addresses across the VDP buses 45 and 46 and a three-stage 16-bit latch circuit for latching read data, and performs bus sizing to convert the addresses and the read data into 32-bit data, which are transferred to the DSP bus 44.

Figure 5:
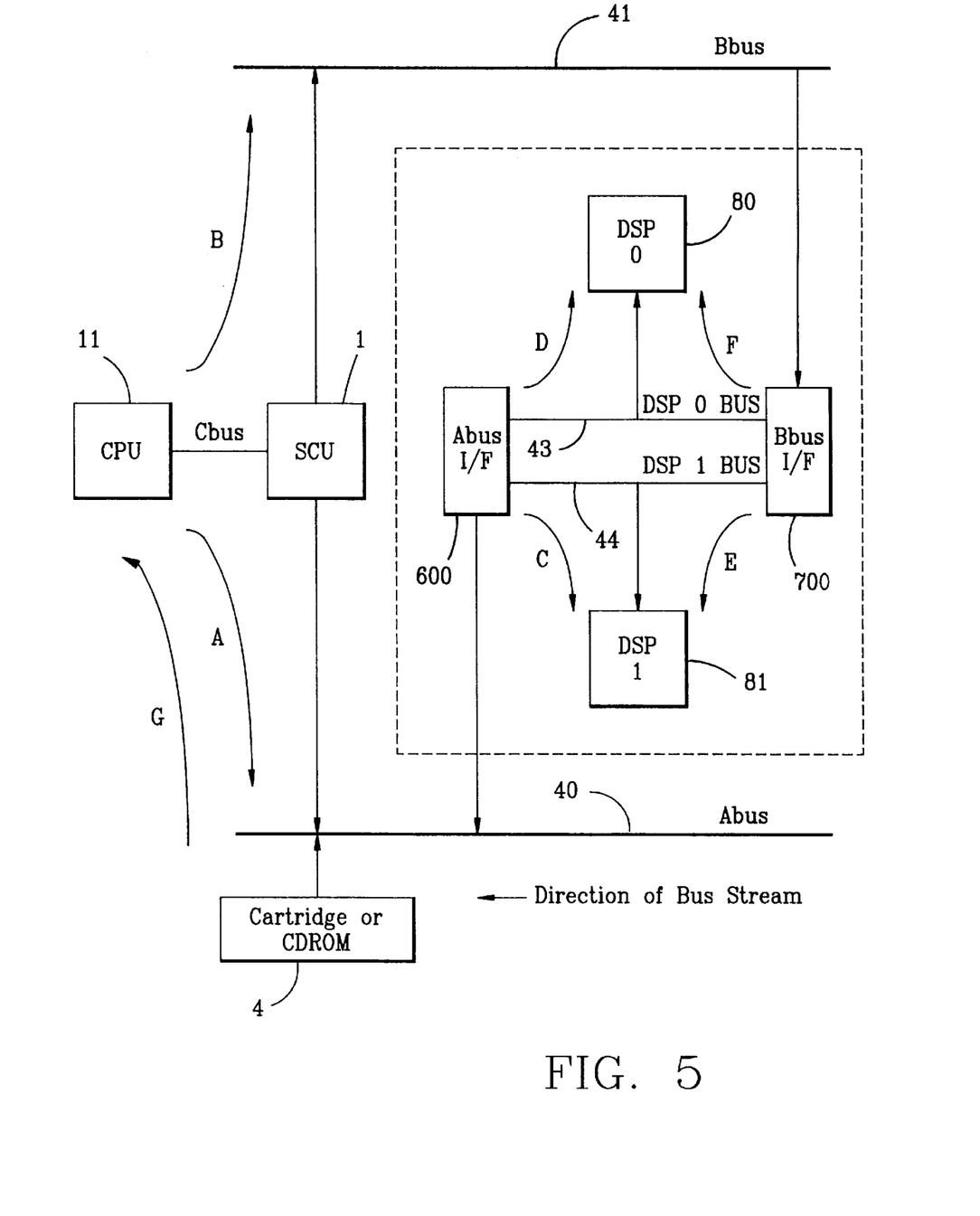
FIG. 5 is a diagram for explaining a method for accessing DSPs 80 and 81.

As is described above, with the interface circuit arrangement shown in FIG. 4, a plurality of access streams can be provided for the first and the second DSPs 80 and 81, as is shown in FIG. 5. Therefore, an access stream that corresponds to a processing method can be selected, and the manner in which an image processing apparatus is used is more susceptible to adaptation.

In other words, there is a method that uses the A-BUS 40, and there is a method that uses B-Bus 41 to access the first and the second DSPs 80 and 81.

Further, there is a method by which the CPU 11 can access the DSPs 80 and 81 directly across the A-BUS 40, and there is a method for indirectly transferring an access to the DSP bus 44 by making a DMA data transfer from a device (a memory cartridge or a CD-ROM) 4 on the A-BUS 40 to the C-BUS 42 or the B-BUS 41.

In FIG. 5, the portion enclosed by the broken line is the one included in the enhanced function board according to the present invention. The A indicates a route that is used by the CPU 11 to access the A-BUS 40 via an SCU1. The B indicates a route that issued by the CPU 11 to access the B-BUS 41 via the SCU1.

The D indicates a route that is used to access the first DSP 80 across the A-BUS 40 via an A-BUS interface (I/F) 600, and the C indicates a route that is used to access the second DSP 81 across the A-BUS 40 via the A-BUS interface (I/F) 600.

The E indicates a route that is used to access the second DSP 81 across the B-BUS 41 via a B-BUS interface (I/F) 700. The F indicates a route that is used to access the first DSP 80 across the B-BUS 41 via the B-BUS interface (I/F) 700. The G indicates a route that is used to access the CPU 11 across the A-BUS 40 via the SCU1.

When the first DSP 80 is to be accessed by the CPU 11, the route A to D is used, and when the second DSP 81 is to be accessed by the CPU 11, the route A to C is employed. In addition, the route B to F can be employed by the CPU 11 to access the first DSP 80, and the route B to E can be employed by the CPU 11 to access the second DSP 81.

When an access is to be indirectly transferred to the DSP bus by making a DMA data transfer from a device (cartridge, a CD-ROM, etc.) 4 on the A-BUS 40 to the C-BUS 42 or the B-BUS 41, the route C to G or G to C is employed.

As is explained while referring to FIG. 4, the A-BUS interface (I/F) 600 and the B-BUS interface (I/F) 700 in FIG. 5 separately indicate the functions of the interface circuits 60 shown in FIG. 2, and correspond to the interface circuits 601 through 606 in FIG. 4.

As is described while referring to FIGS. 4 and 5, according to the present invention, based on the interface circuit arrangement the manner in which interface circuits are connected to the DSPs 80 and 81 can be varied in consonance with the use of the enhanced function board. Examples of various connections are shown in FIGS. 6A through 6C.

Figure 6A:
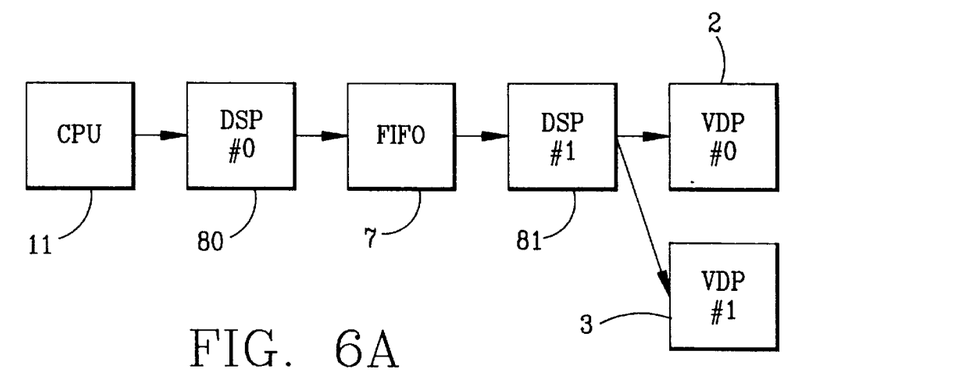
FIGS. 6A, 6B and 6C are diagrams for explaining example connections of DSPs.

In FIG. 6A is shown a serial geometric connection wherein the DSPs 80 and 81 are connected in series, so that responsibility for performing the processing can be divided and shared by the DSPs 80 and 81. Therefore, the FIFO 7 is located between the DSP 80 and the DSP 81. And although using this arrangement results in a data transfer overhead, it is appropriate for executing a computation process that imposes a heavy load, such as clipping or displaying of perspective views.

Figure 6B:
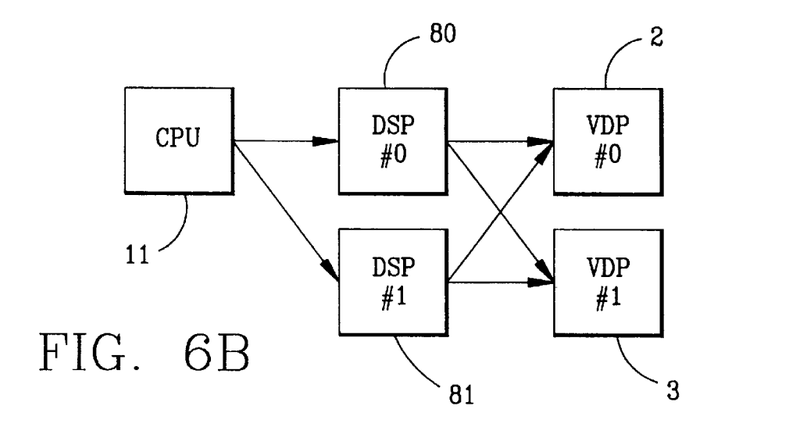

In FIG. 6B is shown a parallel geometric connection where the DSPs 80 and 81 are connected in parallel and can be independently operated. With this arrangement, the performance of the same processing or of different processing can be selected for the DSP 80 and the DSP 81. Since in this arrangement the two DSPs 80 and 81 can access the two VDPs 2 and 3, this arrangement is effective when a large amount of data is required to be transferred to the VDPs 2 and 3. In other words, the DSP 80 can access the VDP 2 or 3, and the DSP 81 can also access the VDP 2 or 3.

Figure 6C:
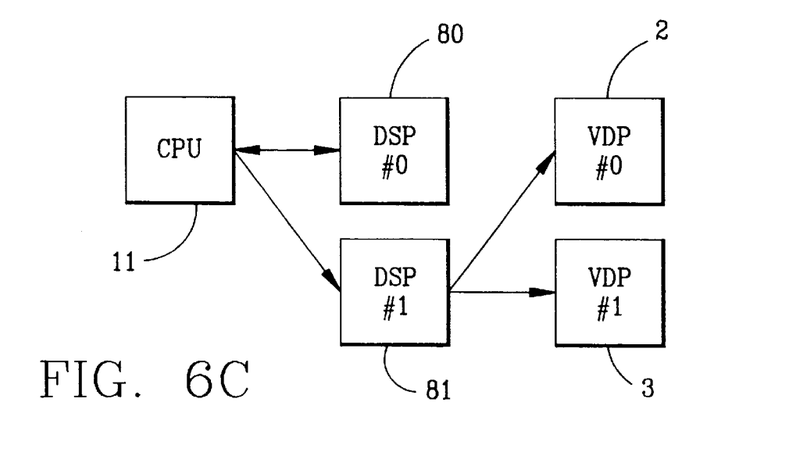

In FIG. 6C is shown a coprocessor and geometric connection, which may be derived from the parallel geometric connection in FIG. 6B, where the DSP 80 is used as a coprocessor for the CPU 11. Since only one DSP that is used as a geometric arrangement is provided, the computation function is degraded. However, as the DSP 80 can be used as the coprocessor for the CPU 11, this form is effective when processing by the CPU 11 is to be performed.

One example wherein the enhanced function board of the present invention is employed will now be explained. The enhanced function board is employed to reduce a load placed on the CPU 11 for the transformation of coordinates that is performed when the CPU 11 employs two-dimensional coordinates, such as screen coordinates, to determine the location of an object having a three dimensional coordinate description that is managed by the CPU 11.

Figure 7A:
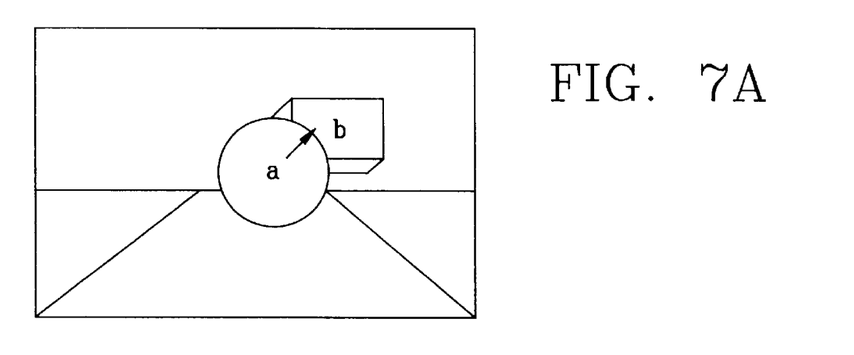
FIGS. 7A and 7B are diagram for explaining object designation.
Figure 7B:
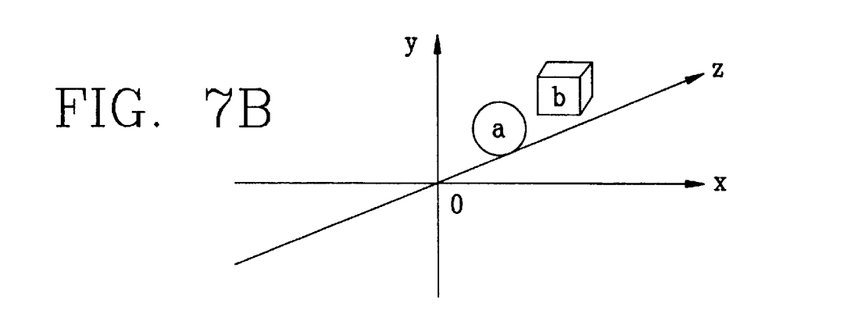

The process whereby the CPU 11 employs two dimensional coordinates, such as screen coordinates, to determine the location of an object having a three-dimensional coordinate description, which is managed by the CPU 11, is required to determine the occurrence of a collision in a shooting game shown in FIGS. 7A and 7B, for example.

An image that is actually output to a display device is processed by the two-dimensional coordinate system of (x, y). The designation of a position using a man-machine interface, such as a mouse or a gun, is performed in the same manner.

On the other hand, an image is managed by the CPU 11 using the three-dimensional coordinate system, and a programmer can easily understand it. Although the three dimensional systems are, beginning closer to the conversion output, a viewpoint coordinate system, a world coordinate system, and a local (physical) coordinate system, the CPU 11 performs the processing up to the world coordinate system, and then a special hardware is used to transform the world coordinate system into the viewpoint coordinate system and the screen (two-dimensional) coordinate system.

As is described above, in many cases, the CPU 11 does not directly handle the data (two-dimensional coordinates) that correspond to the position designated on a two-dimensional display screen by a player using the input pad 10. Therefore, vertex data at the two-dimensional coordinates that are obtained by perspective transformation should be used as a base so that the CPU 11 can efficiently determine a collision has occurred.

FIG. 7A is a two-dimensional screen on which objects a and b are displayed. Assume that the position designated by a pointing device, an arrow, is a position at which a collision will occur on the two-dimensional screen in a shooting game.

In this case, it appears that a point of a collision exists on the object b on the two-dimensional screen in FIG. 7A. However, whether or not the position of object b also corresponds to that of the pointing device when using the three-dimensional coordinates shown in FIG. 7B, which are managed by the CPU 11, can not be determined unless the two-dimensional coordinates are transformed into three-dimensional coordinates.

Figure 8:
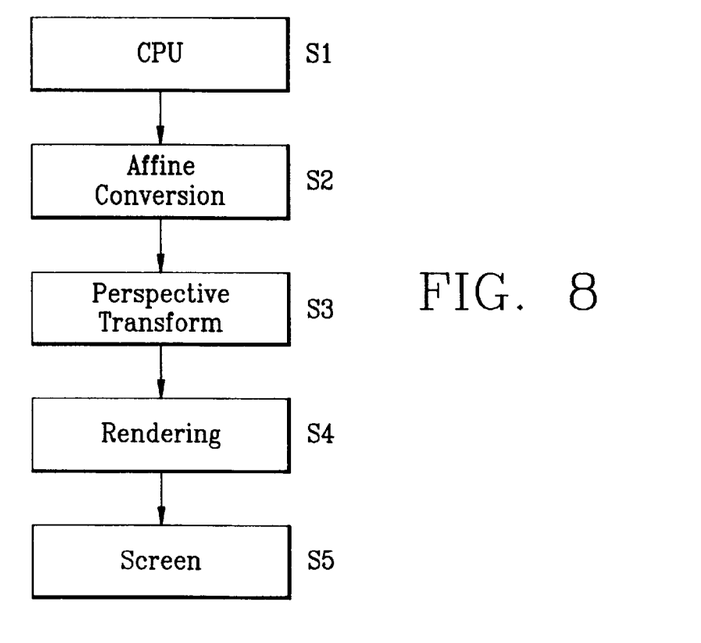
FIG. 8 is a flowchart for a conversion process for image generation.

A sequence of computations required for the coordinate transformation and the displaying process will now be explained while referring to FIG. 8. In FIG. 8, data, such as a model, a matrix, attributes and a command, are transmitted by the CPU 11 to the DSPs 80 and 81 of the enhanced function board of the present invention (step S1). The model is a set of data for the vertexes of a polygon described using the three-dimensional coordinate system. The matrix provides movement or rotation and deformation of the model using the three-dimensional coordinate system.

The attributes include necessary parameters, for example, color and light source information. The command is a processing instruction issued to the enhanced function board, and is used for data identification.

The DSP 80 performs the Affine-conversion. In other words, the vertex data described using the three-dimensional coordinate system (x, y, z), with a viewpoint as a vertex, can be obtained (step S2). More specifically, a matrix for preparing a picture scene is multiplied by the individual vertex for the model, so that each model is transformed into coordinates with a viewpoint as an origin. This process is performed by multiplying a three-dimensional vector by a 3×4 matrix, or by multiplying a four-dimensional vector by a 4×4 matrix.

Following this process, the DSP 81 calculates vertex data that is transformed into two-dimensional coordinates (x, y) on the screen(Step S3). This transformation process is called perspective transformation, in which x and y in the vertex data are normalized using z in order to transform the Affine converted vertex data into coordinates on the screen. At the same time, clipping, that is, a process for removing vertexes placed outside the boundaries of a screen or a visual volume, is also performed. Then, the screen coordinates acquired by the perspective transformation, i.e., the vertex data in the two-dimensional coordinate system, are used to perform rendering for writing color or pallet data to the image memory (Step S4). The rendering is performed along the routes from the texture memory 8 of the enhanced function board via the DMA and the DSP 81 to the I/F of the first VDP 2.

Figure 9:
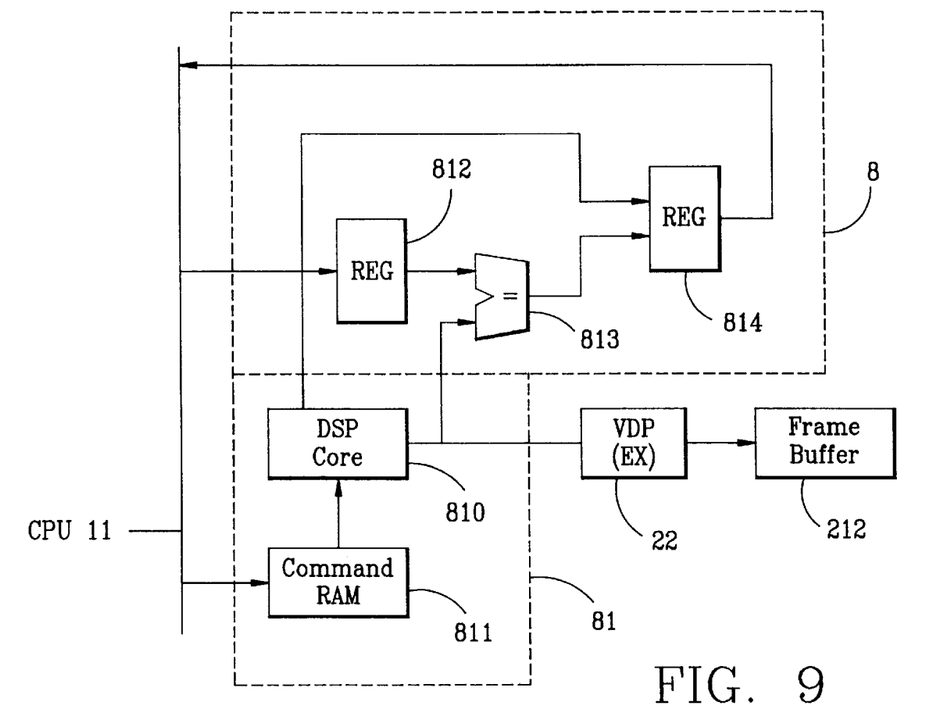
FIG. 9 is a block diagram illustrating one example application for an enhanced function board.

FIG. 9 is a block diagram illustrating one example of the enhanced function board that executes the above described object detection. To simplify the explanation, mainly the DSP 81 and the texture memory 8 in FIG. 2, which are related to this process, will be explained.

In FIG. 9, the DSP 81 includes a DSP core 810 and a command RAM 811, and the texture memory 8 has a comparator 813 and registers 812 and 814.

The DSP core 810 of the DSP 81 performs perspective transformation, i.e., transforms three-dimensional data into two-dimensional real addresses. The address at the screen coordinate location (two-dimensional coordinate location) of an object to be detected is set in the register 812 by the CPU 11.

Further, image data that is consonant with the displaying sequence of a game program is transmitted by the CPU 11 to the command RAM 811. The image data are transmitted via the DSP core 810 to the enhancing VDP 22, where an image for a screen is formed and developed as the data for one screen in the frame buffer 212.

During the process whereby the image data is transmitted via the DSP core 810 and the VDP 22 and is developed in the frame buffer 212, an address to be used for image formation is sent to the comparator 813. The comparator 813 compares the screen coordinate location of the object, which was set in the register 812 for the detection, with the address for the image data obtained from the DSP core 810.

Figure 10:
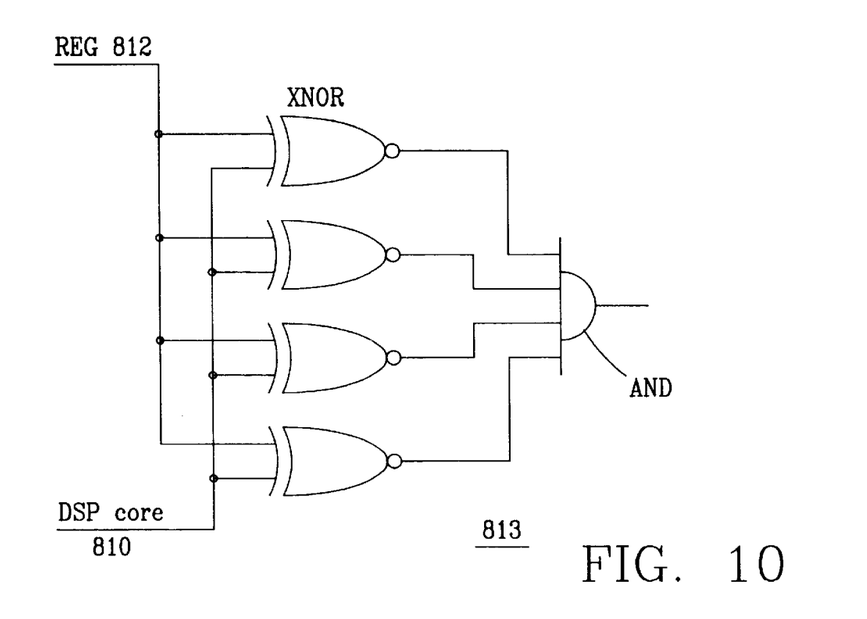
FIG. 10 is a diagram illustrating an example arrangement of a comparison matching circuit.

An example arrangement of the comparator 813 is shown in FIG. 10. In FIG. 10, the screen coordinate location of the object and the image data are received by four exclusive-NOR gates XNOR, each of which has an inverter at its output terminal. Each of the exclusive-NOR gates XNOR goes high when two inputs match, and goes low when they do not match. The output from the AND gate is high when the four bits from the register 812 and the four bits from the DSP core 810 match completely.

Referring back to FIG. 9, the register 814 stores the address of the image data from the DSP core 810 in accordance with a strobe signal that is output when the comparator 813 determines the match. When the displaying sequence is completed, the CPU 11 confirms the contents stored in the register 814. Then, the CPU 11 performs scoring in consonance with the program of a shooting game, etc.

Since two-dimensional coordinates that are generated by the core 810 of the DSP 81 are employed, the CPU 11 does not have to recalculate two-dimensional coordinates, and thus its load is reduced. Further, as the matching determination process is performed by the VDP 22 in parallel with the displaying process, almost no time is lost. It should be noted that the circuit shown in FIG. 9 is effective not only for the detection of a three-dimensional object but also for the detection of a two-dimensional object.

As is described in this embodiment, according to the present invention provided is an enhanced function board that can provide a higher performance, and that can easily change a connection and a data stream in consonance with the purpose of use.

Further according to the present invention, provided is an arrangement of the enhanced function board with which the CPU can easily perform calculations, using the two-dimensional coordinates for a screen, to determine the existence of an object described with a three-dimension system, which is managed by the CPU, so that the load placed on the CPU can be reduced.

Numerous other alternative embodiments of the present Invention may be devised without departure from the spirit and scope of the following claims.

What is claimed is:

1. An enhanced function board, which can be connected via a connector to an image processing apparatus that includes a CPU, a memory in which image data is stored, and a video signal processor for accessing said memory to read said image data and prepare a display image based on said image data under control of said CPU, the enhanced function board comprising:

a pair of buses;

first and second digital signal processors respectively connected to said pair of buses;

a FIFO memory connected between said pair of buses for transferring data between said first and second digital signal processors; and an interface circuit connected to said pair of buses, whereby said first and said second digital signal processors are connected via said interface circuit to said CPU and said video signal processor.

2. The enhanced function board according to claim 1, wherein said image processing apparatus comprises;

a first bus connected to said memory in which image data is stored, and a second bus connected to said video signal processor, and said interface circuit connects said first and second buses to said pair of buses to which said first and second digital signal processors are connected.

3. The enhanced function board according to claim 2, wherein said memory in which said image data is stored is a ROM(Read Only Memory) that is retained in a memory cartridge that is removably attached to said image processing apparatus.

4. The enhanced function board according to claim 3, wherein said image processing apparatus further comprises a third bus connected to said CPU, and a main board mounted with a first connector to which said memory cartridge is removably attached, and second through fourth connectors respectively connected to said first through third buses, and a fifth connector connected at least to a timing signal line; and wherein, from among said first through fifth connectors mounted on said main board, a first set of connectors that engage said second through fifth connectors are provided on one surface at locations corresponding to those of said second through fifth connectors mounted on said main board.

5. The enhanced function board according to claim 4, further comprising a second set of connectors mounted at positions, on the other surface opposite to said one surface, corresponding to said first set of connectors.

6. An image processing apparatus comprising:

a main body including a CPU, a memory device in which image data is stored, and a video signal processor for accessing said memory to read said image data and for preparing display data based on said image data under the control of said CPU; and an enhanced function board, connected via a connector to said main body, and including a pair of buses, first and second digital signal processors connected to said pair of buses respectively, a FIFO memory connected between said pair of buses for operatively connecting said first and second digital signal processors to said CPU and said video signal processor.

7. The enhanced function board according to claim 6, wherein said enhanced function board further comprise a first bus connected to said memory device and a second bus connected to said video signal processor, and wherein said interface circuit connects said first and second buses to said first and said second digital signal processors, respectively.

8. The image processing apparatus according to claim 6, wherein said memory device is a Read Only Memory retained in a memory cartridge removably attached to said main body for storing a game program, which is executed by the said CPU.

9. The image processing apparatus according to claim 6, wherein said image data include data for a background image and for an object image displayed on said background image, and wherein said video signal processor includes a first processor for performing a deformation process on said object image, and a second processor for controlling scrolling of said background image.

10. The image processing apparatus according to claim 9, wherein said CPU, said first digital signal processor, said FIFO memory and said second digital signal processor are connected in series by said interface circuit of said enhanced function board, and wherein said first processor and second processor are connected in parallel to said second digital signal processor.

11. The image processing apparatus according to claim 9, wherein said first and second digital signal processors are connected in parallel to said CPU by said interface circuit of said enhanced function board, and wherein said first and second processors are respectively connected in parallel to said first and second digital signal processors.

12. The image processing apparatus according to claim 9, wherein said first and second digital signal processors are connected in parallel to said CPU by said interface circuit of said enhanced function board, and wherein said first and second processors are connected in parallel to said first or second digital signal processor.

13. The image processing apparatus according to claim 9, wherein said first digital signal processor receives three-dimensional coordinate image data from said CPU and transforms said three-dimensional coordinate image data into corresponding two-dimensional coordinate image data, and said enhanced function board further includes a circuit for receiving a specific address from said CPU, and for performing a comparison to detect a data position corresponding to said specific address for said transformed two-dimensional coordinate image data.

14. The image processing apparatus according to claim 6, wherein said first digital signal processor receives three-dimensional coordinate image data from said CPU and transforms said three-dimensional coordinate image data into corresponding two-dimensional coordinate image data, and said enhanced function board further includes a circuit for receiving a specific address from said CPU, and for performing a comparison to detect a data position corresponding to said specific address for said transformed two-dimensional coordinate image data.

* * * * *